US012795728B2

(12) United States Patent
Chen et al.

(10) Patent No.: US 12,795,728 B2
(45) Date of Patent: Nov. 10, 2026

(54) CHANNEL OCCUPANCY TIME (COT) SHARING REQUEST IN SIDELINK

(71) Applicant: QUALCOMM Incorporated, San Diego, CA (US)

(72) Inventors: Siyi Chen, Beijing (CN); Giovanni Chisci, San Diego, CA (US); Arumugam Chendamarai Kannan, San Diego, CA (US); Xiaoxia Zhang, San Diego, CA (US); Jing Sun, San Diego, CA (US); Rajat Prakash, San Diego, CA (US); Hao Xu, Beijing (CN); Changlong Xu, Beijing (CN); Luanxia Yang, Beijing (CN); Shaozhen Guo, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 327 days.

(21) Appl. No.: 18/577,613

(22) PCT Filed: Sep. 22, 2021

(86) PCT No.: PCT/CN2021/119518

§ 371 (c)(1),
(2) Date: Jan. 8, 2024

(87) PCT Pub. No.: WO2023/044601

PCT Pub. Date: Mar. 30, 2023

(65) Prior Publication Data

US 2024/0349340 A1 Oct. 17, 2024

(51) Int. Cl.
*H04W 74/0816* (2024.01)
*H04L 27/26* (2006.01)
(Continued)

(52) U.S. Cl.
CPC ..... *H04W 74/0816* (2013.01); *H04L 27/2605* (2013.01); *H04W 28/0278* (2013.01); *H04W 92/18* (2013.01)

(58) Field of Classification Search
None
See application file for complete search history.

(56) References Cited

U.S. PATENT DOCUMENTS 11,510,131 B2 11/2022 Zhu et al.
2021/0092783 A1* 3/2021 Sun .................. H04W 74/0875
(Continued)

FOREIGN PATENT DOCUMENTS

WO WO-2020164439 A1 8/2020
WO WO-2020190190 A1 9/2020
WO WO-2021061880 A1 4/2021

OTHER PUBLICATIONS

Supplementary European Search Report—EP21957748—Search Authority—The Hague—Apr. 11, 2025 (2107445EP).
(Continued)

*Primary Examiner* — Willie J Daniel, Jr.
(74) *Attorney, Agent, or Firm* — NORTON ROSE FULBRIGHT US LLP

(57) ABSTRACT

This disclosure provides systems, methods, and devices for wireless communication that support mechanisms for sidelink channel occupancy time (COT) sharing request signaling in a wireless communication system. A sidelink transmitting user equipment (UE) transmits a COT sharing request to a sidelink initiator UE. The COT sharing request indicates to the initiator UE to initiate sharing of a COT acquired by the initiator UE with the transmitting UE. The initiator UE, in response to receiving the COT sharing request, determines to acquire the COT, and initiates COT sharing by transmitting, to the transmitting UE, COT sharing information including information to facilitate access to the
(Continued)

COT by the transmitting UE. The transmitting UE, based on the COT sharing information received from the initiator UE, access the sidelink channel during the COT and transmits data over the sidelink channel.

30 Claims, 6 Drawing Sheets

(51) Int. Cl.
*H04W 28/02* (2009.01)
*H04W 92/18* (2009.01)

(56) References Cited

U.S. PATENT DOCUMENTS

2021/0136732 A1 5/2021 Fakoorian et al.
2021/0136783 A1 5/2021 Fakoorian et al.
2021/0195637 A1 6/2021 Xue et al.

OTHER PUBLICATIONS

Apple Inc: "On Unlicensed Band Enhancement", 3GPP TSG RAN Rel-18 workshop, RWS-210503, Electronic Meeting, Jun. 28-Jul. 2, 2021, Jun. 7, 2021 (Jun. 7, 2021), 4 Pages, Section 2.
International Search Report and Written Opinion—PCT/CN2021/119518—ISA/EPO—Jun. 29, 2022 (2107445WO1).

* cited by examiner

CHANNEL OCCUPANCY TIME (COT) SHARING REQUEST IN SIDELINK

TECHNICAL FIELD

Aspects of the present disclosure relate generally to wireless communication systems, and more particularly, to sidelink channel occupancy time (COT) sharing signaling.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes transmitting a channel occupancy time (COT) sharing request to a second UE. In aspects, the COT sharing request indicates to the second UE to initiate sharing with the UE of a COT acquired by the second UE to access a sidelink channel. The method further includes receiving COT sharing information from the second UE, the COT sharing information configured to facilitate access to the COT by the UE, and transmitting data during the COT over the sidelink channel to one or more sidelink UEs.

In an additional aspect of the disclosure, a method of wireless communication performed by a UE includes receiving, from a second UE, a COT sharing request to initiate sharing with the second UE of a COT acquired by the UE to access a sidelink channel, determining to acquire the COT for COT sharing with the second UE, and transmitting COT sharing information to the second UE, the COT sharing information configured to facilitate access to the acquired COT by the second UE.

In an additional aspect of the disclosure, a UE includes at least one processor and a memory coupled to the at least one processor. The at least one processor stores processor-readable code that, when executed by the at least one processor, is configured to perform operations including transmitting a COT sharing request to a second UE. In aspects, the COT sharing request indicates to the second UE to initiate sharing with the UE of a COT acquired by the second UE to access a sidelink channel. The operations further include receiving COT sharing information from the second UE, the COT sharing information configured to facilitate access to the COT by the UE, and transmitting data during the COT over the sidelink channel to one or more sidelink UEs.

In an additional aspect of the disclosure, a UE includes at least one processor and a memory coupled to the at least one processor. The at least one processor stores processor-readable code that, when executed by the at least one processor, is configured to perform operations including receiving, from a second UE, a COT sharing request to initiate sharing with the second UE of a COT acquired by the UE to access a sidelink channel, determining to acquire the COT for COT sharing with the second UE, and transmitting COT sharing information to the second UE, the COT sharing information configured to facilitate access to the acquired COT by the second UE In an additional aspect of the disclosure, a non-transitory computer-readable medium stores instructions that, when executed by a processor, cause the processor to perform operations. The operations include transmitting a COT sharing request to a second UE. In aspects, the COT sharing request indicates to the second UE to initiate sharing with the UE of a COT acquired by the second UE to access a sidelink channel. The operations further includes receiving COT sharing information from the second UE, the COT sharing information configured to facilitate access to the COT by the UE, and transmitting data during the COT over the sidelink channel to one or more sidelink UEs.

In an additional aspect of the disclosure, a non-transitory computer-readable medium stores instructions that, when executed by a processor, cause the processor to perform operations. The operations include receiving, from a second UE, a COT sharing request to initiate sharing with the second UE of a COT acquired by the UE to access a sidelink channel, determining to acquire the COT for COT sharing with the second UE, and transmitting COT sharing information to the second UE, the COT sharing information configured to facilitate access to the acquired COT by the second UE.

In an additional aspect of the disclosure, an apparatus includes means for transmitting a COT sharing request to a second UE. In aspects, the COT sharing request indicates to the second UE to initiate sharing with the UE of a COT acquired by the second UE to access a sidelink channel. The apparatus further includes means for receiving COT sharing information from the second UE, the COT sharing information configured to facilitate access to the COT by the UE, and means for transmitting data during the COT over the sidelink channel to one or more sidelink UEs.

In an additional aspect of the disclosure, an apparatus includes means for receiving, from a second UE, a COT sharing request to initiate sharing with the second UE of a COT acquired by the UE to access a sidelink channel, means for determining to acquire the COT for COT sharing with the second UE, and means for transmitting COT sharing information to the second UE, the COT sharing information configured to facilitate access to the acquired COT by the second UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
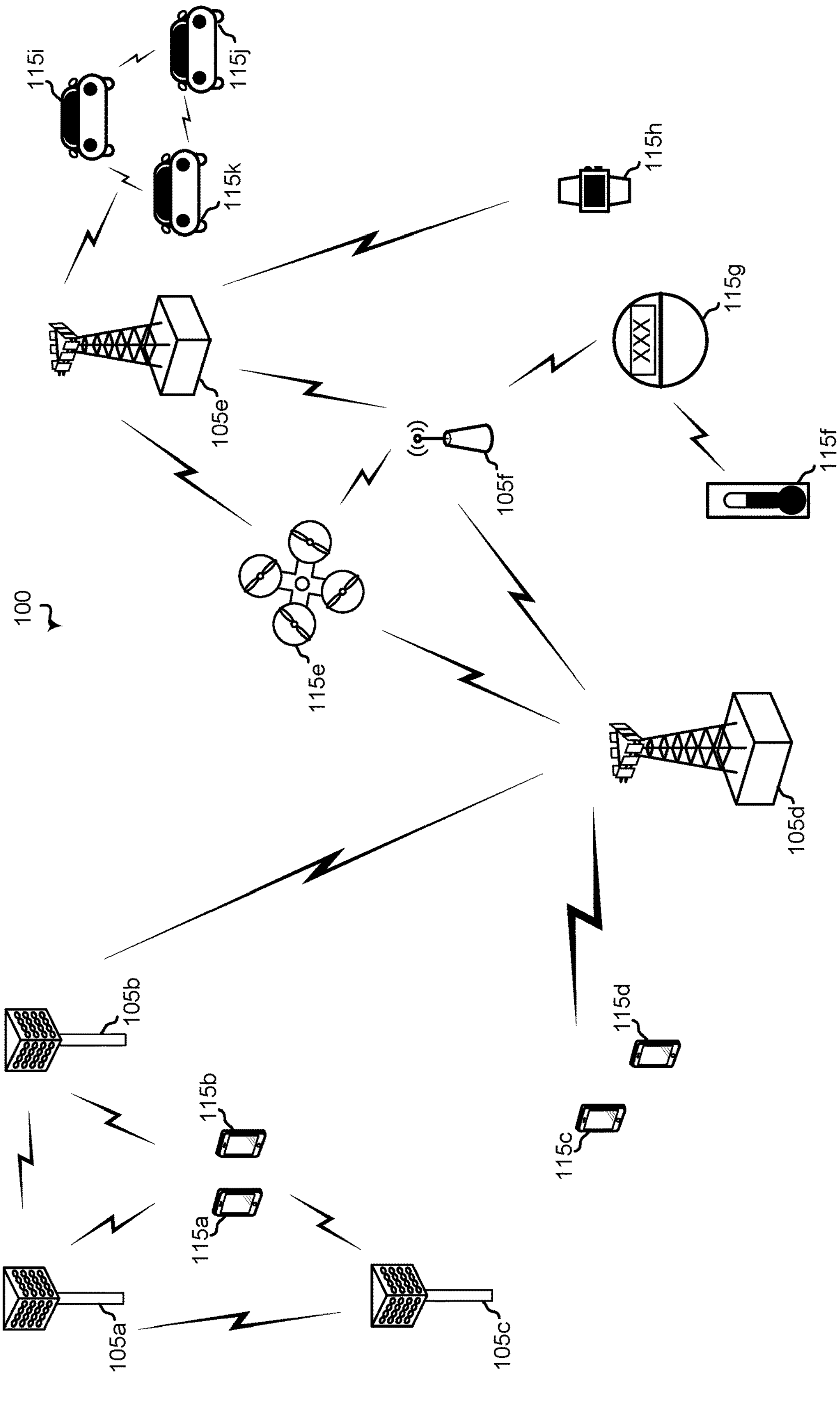
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations **105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f*** is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
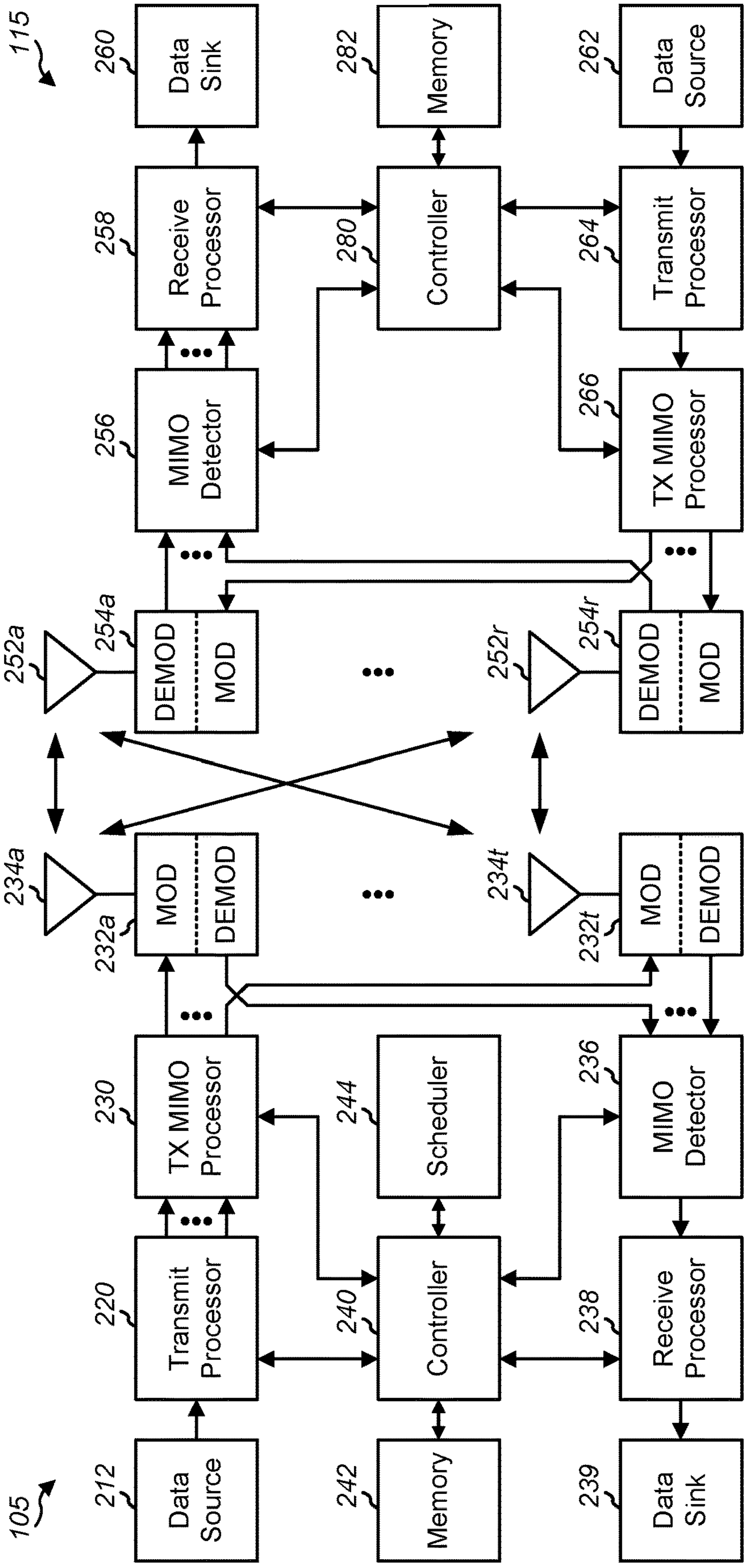
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current implementations of wireless communication systems implement sidelink communications in which a UE communicates with other UEs directly over a sidelink. Sidelink communications may be particularly useful in Internet of Things (IoT) and/or vehicle-to-everything (V2X) application, in which delivering safety related messages in a sub-6 GHz licensed bands is particularly important.

In some implementations, SL communications between two UEs may operate in one of various modes. In particular, two modes for channel/resource allocation have been specified in current wireless communication system implementations. One such mode, also known as sidelink mode 2, involves a transmitting node autonomously scheduling sidelink transmissions to a receiving UE(s) over the sidelink without the transmitting UE obtaining a transmission grant from a serving base station before it is allowed to transmit to the receiving UE over the sidelink. In another mode, also known as sidelink mode 1, a base station may schedule the sidelink transmissions between the transmitting UE and the receiving UE(s). For example, in sidelink mode 1, a UE may transmit to another UE over the sidelink, but the transmitting UE must obtain a transmission grant (e.g., in a downlink control information (DCI) message) from the serving base station before it is allowed to transmit to the receiving UE over the sidelink. In sidelink mode 1, without a transmission grant, the transmitting UE is not allowed to transmit to the receiving UE over the sidelink. However, once the base station grants the transmission grant to the transmitting UE, the transmitting UE may transmit to the receiving UE over the sidelink.

In implementations, the sidelink transmission may follow a particular scheme. For example, the transmitting UE may transmit control information in a sidelink control information (SCI) message to the receiving UE. The receiving UE may use the control information in the SCI to receive and/or to decode a data transmission (e.g., a co-subchannel physical sidelink shared channel (PSSCH) transmission) from the transmitting UE. In current implementations, each sidelink channel access may include a physical sidelink control channel (PSCCH) transmission carrying the SCI coupled to the PSSCH transmission. The coupled transmission of the PSCCH and PSSCH may be occupy at least one subchannel and may carry one transport block (TB) of data. In these implementations, the SCI may be transmitted in a two-stage procedure, which include stage 1 SCI and stage 2 SCI. In stage 1 SCI, the transmitting UE may transmit information that may include resource reservations and allocations, modulation and coding scheme (MCS), demodulation reference signal (DMRS) configuration, priority associated with a PSSCH transmission, information on how to decode the stage 2 SCI, etc. In stage 2 SCI, which may be transmitted in the PSSCH transmission (e.g., may be piggy-backed onto the co-subchannel PSSCH transmission), the transmitting UE may transmit control information on how to decode and process the PSSCH transmission, and/or information including source ID, destination ID, sidelink SL process control, hybrid automatic repeat request (HARQ) process ID, HARQ enabled/disabled indications, transmission type and/or CSI request, transmitting UE's zone ID and required communication range, and/or information that may not be able to be carried in stage 1 SCI. With the SCI control information, the receiving UE may receive and decode the PSSCH transmission and may determine feedback resources for reporting feedback associated with the PSSCH transmission.

When sidelink communication is implemented over dedicated spectrum or licensed spectrum, the implementation is relatively straightforward, as sidelink channel access in the dedicated spectrum or licensed spectrum is guaranteed. However, sidelink channel access in a shared spectrum or an unlicensed spectrum is not guaranteed, and in this case, sidelink UEs may be required to contend for channel access in the spectrum, for example, via CCA and/or LBT procedures. For example, a transmitting UE may contend for a COT in the shared spectrum in order to communicate over the sidelink with one or more sidelink UEs by performing an LBT procedure (e.g., a category 4 (Cat4) LBT) in the shared spectrum to acquire to a COT to access a sidelink channel. After winning the contention and acquiring the COT to transmit over the sidelink channel, the transmitting UE may transmit data over the sidelink (e.g., a PSSCH transmission, and/or SCI via a PSCCH transmission) to a receiving UE. In some implementations, the transmitting UE may share the COT with other sidelink UEs (e.g., when the transmitting UE does not need the entire duration of the COT for its data transmissions) so that the other sidelink UEs may opportunistically join the COT and utilize any unoccupied frequency interlaces and/or unoccupied time resources for their own transmissions. COT sharing thus enables reducing channel access overhead and improves channel access probability for other UEs that may not otherwise be able to access the sidelink channel. However, currently, COT sharing may only occur when a transmitting UE has finished its data transmission and may share the remaining COT with the other sidelink UEs, as a UE may not acquire a COT without a data buffer or with no data to be transmitted, and as such may not share a COT with other sidelink UEs.

As noted above, a UE in a shared spectrum or an unlicensed spectrum may have difficulty obtaining access to the unlicensed spectrum for sidelink communications. For example, in a sidelink implementations, UEs may be randomly distributed across the network. UEs that are far away from (or not nearby) other UEs may suffer (and may cause) light interference from transmissions from those other UEs. However, UEs that are nearby or close to other UEs may suffer (and may cause) heavy interference from transmissions from those other nearby UEs. As UEs need to perform LBT procedures to access a sidelink channel in the shared spectrum, the different interference levels suffered by the different UEs may result in different probabilities for the various UEs of LBT success. For example, a poorly placed UE (e.g., a UE that is placed nearby other UEs and may thus suffer from heavy interference from those UEs) may have difficulty winning the shared spectrum (e.g., acquiring a COT for a sidelink channel within the shared spectrum), which may cause link starvation for this poorly placed UE. On the other hand, a well-placed UE (e.g., a UE that is placed relatively away from other UEs and may thus not suffer from heavy interference from those UEs) may not have as much difficulty winning the shared spectrum as a poorly-placed UE. As such, well-placed UEs may have a high probability of LBT success, and poorly placed UEs may have a low probability of LBT success.

Various aspects of the present disclosure are directed to systems and methods that support mechanisms for sidelink COT sharing request signaling in a wireless communication system. In aspects, a transmitting UE (e.g., a sidelink UE wishing or intending to transmit a data transmission to a receiving UE over the sidelink) transmits a COT sharing request to another sidelink UE. For example, in some aspects, the transmitting UE may transmit the COT sharing request to an initiator UE. The COT sharing request may indicate to the initiator UE to initiate sharing with the transmitting UE a COT acquired by the initiator UE to access a sidelink channel. The initiator UE may, in response to receiving the COT sharing request, acquire the COT, and may then transmit to the transmitting UE COT sharing information including information to facilitate access to the COT by the transmitting UE. The transmitting UE may, based on the COT sharing information received from the initiator UE, access the sidelink channel during the COT and may transmit data over the sidelink channel. The transmitting UE may transmit the date over the sidelink channel to the initiator UE or to another receiving UE.

In some aspects, the transmitting UE may be a poorly placed UE, and the initiator UE may be a well-placed UE. For example, the transmitting UE may be determined to be a poorly placed UE based on a percentage of measured samples of received signals received from other sidelink UEs whose RSSI is higher than a threshold. When the percentage of samples having an RSSI higher than the threshold is higher than a percentage threshold, the transmitting UE is determined to be a poorly-placed UE. This is because a high percentage of samples having an RSSI greater than the threshold indicates that the UE has a low probability of winning the shared spectrum, as there is likely heavy interference on the UE caused by nearby UEs. On the other hand, a well-placed UE may be one whose percentage of samples having an RSSI is lower higher than the threshold is lower than a well-placed percentage threshold. This is because a low percentage of samples having an RSSI greater than the threshold indicates that the UE has a high probability of winning the shared spectrum, as there is likely low interference on the UE caused by nearby UEs.

Figure 3:
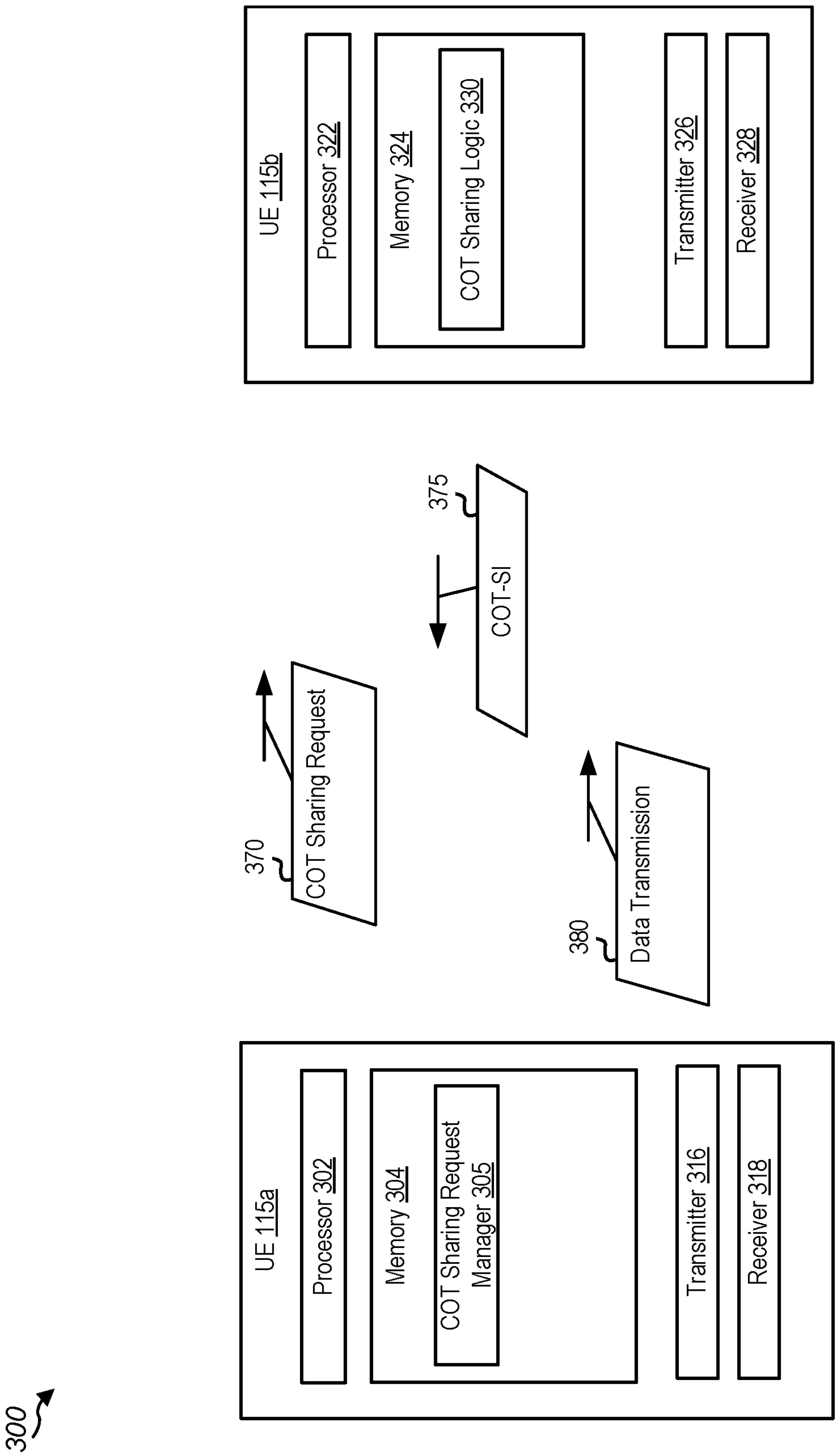
FIG. 3 is a block diagram illustrating an example wireless communication system that supports mechanisms for sidelink channel occupancy time (COT) sharing request signaling in a wireless communication system according to one or more aspects.

FIG. 3 is a block diagram of an example wireless communications system 300 that supports mechanisms for sidelink COT sharing request signaling in a wireless communication system according to one or more aspects of the present disclosure. In some examples, wireless communications system 300 may implement aspects of wireless network 100. Wireless communications system 300 includes UE 115*a* and UE 115*b*, and may implement a sidelink communication scheme (e.g., sidelink mode 2 or sidelink mode 1). In aspects, UE 115*a* and UE 115*b* may be in communication over a sidelink. In the discussion that follows, UE 115*a* may be described as a transmitting UE and UE 115*b* may be described as an initiator UE, and in this context transmitting UE 115*a* may request that initiator UE 115*b* initiates sharing of a COT acquired by initiator UE 115*b*. In this context, initiator UE 115*b* may receive the COT sharing request from transmitting UE 115*a* and may acquire a COT, and may send COT sharing information to transmitting UE 115*a*. In aspects, initiator UE 115*b* may not have data to transmit during the COT, and may acquire the COT exclusively for sharing the COT with transmitting UE 115*a*. However, this description of UE 115*a* as an initiator UE and UE 115*b* as a responder UE, as well as the description of system 300 as including two UEs, is merely for illustrative purposes and not intended to be limiting in any way. As such, wireless communications system 300 may generally include additional initiator and/or responder UEs.

UE 115*a* may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store COT sharing request manager 305. In aspects, COT sharing request manager 305 may be configured to perform operations for determining to transmit a COT sharing request to initiator UE 115*b*, for configuring the COT sharing request, and for configuring data transmissions over a sidelink channel during the COT shared by initiator UE 115*b* in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

UE 115*b* also may include a variety of components (such as structural, hardware components) used for carrying out one or more functions described herein. For example, these components may include one or more processors 322 (hereinafter referred to collectively as "processor 322"), one or more memory devices 324 (hereinafter referred to collectively as "memory 324"), one or more transmitters 326 (hereinafter referred to collectively as "transmitter 326"), and one or more receivers 328 (hereinafter referred to collectively as "receiver 328"). Processor 322 may be configured to execute instructions stored in memory 324 to perform the operations described herein. In some implementations, processor 322 includes or corresponds to one or more of receive processor 258, transmit processor 264, and controller 280, and memory 324 includes or corresponds to memory 282.

Memory 324 includes or is configured to store COT sharing logic 330. In aspects, COT sharing logic 306 may be configured to perform COT sharing operations with transmitting UE 115*a* in accordance with aspects of the present disclosure. For example, in aspects, COT sharing logic 306 may be configured to, in cooperation with other components of initiator UE 115*b*, receive a COT sharing request from transmitting UE 115*a*, to acquire a COT in response to receiving the COT sharing request, and to transmit COT sharing information to transmitting UE 115*a* to facilitate transmitting UE 115*a* accessing a sidelink channel during the COT. In aspects, initiator UE 115*b* may not have data to transmit during the COT, and may acquire the COT exclusively for sharing the COT with transmitting UE 115*a*.

Transmitter 326 is configured to transmit reference signals, control information and data to one or more other devices, and receiver 328 is configured to receive references signals, synchronization signals, control information and data from one or more other devices. For example, transmitter 326 may transmit signaling, control information and data to, and receiver 328 may receive signaling, control information and data from, base station 105. In some implementations, transmitter 326 and receiver 328 may be integrated in one or more transceivers. Additionally or alternatively, transmitter 326 or receiver 328 may include or correspond to one or more components of UE 115 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, transmitting UE 115*a* may determine to request COT sharing from initiator UE 115*b*. In aspects, transmitting UE 115*a* may determine that transmitting UE 115*a* is a poorly-placed UE. For example, as noted above, transmitting UE 115*a* may determine to have a low probability of winning a shared spectrum for transmitting a data transmission over a sidelink channel. This may be the case when transmitting UE 115*a* may have a low probability of success when performing an LBT procedure to acquire a COT for access the sidelink channel within the shared spectrum due to a high channel occupancy of the sidelink channel (e.g., due to heavy interference from nearby UEs). In aspects, transmitting UE 115*a*'s probability of a successful LBT procedure may be based on the channel occupancy of the sidelink channel. The channel occupancy may be measured by transmitting UE 115*a*, by measuring the percentage of samples of received signals received from other sidelink UEs whose RSSI is higher than a threshold. For example, transmitting UE 115*a* may sample a plurality of received signals received from other sidelink UEs. An RSSI may be measured for each sample. The channel occupancy may refer to the percentage of samples whose RSSI measurement is above a threshold RSSI value. When the channel occupancy is above a percentage threshold (e.g., when the percentage of samples whose RSSI measurement is above a threshold RSSI value is above a percentage threshold) transmitting UE 115*a* may be determined to have a low probability of LBT success, as the high percentage of samples having a large RSSI may indicate that transmitting UE 115*a* is experiencing heavy interference from other UEs. Based on this determination that transmitting UE 115*a* has a low probability of LBT success, transmitting UE 115*a* may be determined to be a poorly-placed UE. Transmitting UE 115*a* may determine to request COT sharing from another sidelink UE based on the determination that transmitting UE 115*a* is a poorly-placed UE.

In some aspects, transmitting UE 115*a* determines to request COT sharing from initiator UE 115*b* without determining whether initiator UE 115*b* is a well-placed UE with a high probability of LBT success or not. In these aspects, transmitting UE 115*a* may transmit COT sharing request 370 to initiator UE 115*b* requesting that initiator UE 115*b* shared an acquired COT, and initiator UE 115*b* may determine whether to acquire and/or share the COT based on its own procedure. For example, initiator UE 115*b* may determine that initiator UE 115*b* has a low probability of a successful LBT procedure (e.g., a probability not higher than a probability threshold), in which case initiator UE 115*b* may not acquire and/or share a COT with transmitting UE 115*a* despite transmitting UE 115*a* transmitting COT sharing request 370 to initiator UE 115*b*. On the other hand, initiator UE 115*b* may determine that initiator UE 115*b* has a high probability of LBT success (e.g., a probability higher than a probability threshold), in which case initiator UE 115*b* may, in response to receiving COT sharing request 370 from transmitting UE 115*a*, acquire and/or share a COT to access the sidelink channel within the shared spectrum with transmitting UE 115*a*.

In some aspects, transmitting UE 115*a* may determine to request COT sharing from initiator UE 115*b* based on a determination that initiator UE 115*b* is a well-placed UE with a high probability of LBT success. For example, in some aspects, transmitting UE 115*a* and initiator UE 115*b* may exchange a channel occupancy measurement with each other, and transmitting UE 115*a* may determine whether to request COT sharing from initiator UE 115*b* based on the exchanged channel occupancy measurements. Initiator UE 115*b* may transmit a channel occupancy measurement (e.g., a percentage of samples measured by initiator UE 115*a* whose RSSI measurements are above a threshold RSSI value). Transmitting UE 115*a* may compare the channel occupancy measurement received from initiator UE 115*b* with the channel occupancy measurements as measured by transmitting UE 115*a* to determine which of transmitting UE 115*a* and initiator UE 115*b* has a higher probability of LBT success. In this case, a higher channel occupancy measurement may indicate a lower probability of LBT success, and a lower channel occupancy measurement may indicate a higher probability of LBT success. Transmitting UE 115*a* may determine to request COT sharing from initiator UE 115*b* when the channel occupancy measurements received from initiator UE 115*b* indicates a higher probability of LBT success by initiator UE 115*b* than by transmitting UE 115*a* (e.g., when the channel occupancy measured by initiator UE 115*b* is lower than the channel occupancy measured by transmitting UE 115*a*).

In some aspects, sidelink UEs may maintain a blacklist that includes information (e.g., an ID, such as a source ID included in the COT sharing request) about any sidelink UE from which a COT sharing request has been received. A COT sharing request from a sidelink UE may indicate that the sidelink UE has a low probability of LBT success, and thus al ow probability of acquiring a COT to access a sidelink channel within the shared spectrum. In this manner, a sidelink UE may maintain a blacklist of sidelink UEs with a low probability of LBT success and thus, a blacklist of poorly-placed UEs. In these aspects, transmitting UE 115*a* may determine whether to request COT sharing from initiator UE 115*b* based on a determination of whether initiator UE 115*b* is in a blacklist of poorly-placed UEs maintained by transmitting UE 115*a*. Transmitting UE 115*a* may determine to request COT sharing from initiator UE 115*b* when initiator UE 115*b* is not in the blacklist of poorly-placed UEs maintained by transmitting UE 115*a*. However, transmitting UE 115*a* may determine to forego requesting COT sharing from initiator UE 115*b* when initiator UE 115*b* is in the blacklist of poorly-placed UEs maintained by transmitting UE 115*a*.

In some aspects, a timing associated with a previous COT sharing request may be included in the blacklist. In these cases, transmitting UE 115*a* may not consider initiator UE 115*b* as a candidate for COT sharing for at least T seconds after the previous COT sharing request received from initiator UE 115*b*. In this manner, transmitting UE 115*a* may not request COT sharing from initiator UE 115*b* for a T period of time after initiator UE 115*b* has indicated a low probability of LBT success. On the other hand, transmitting UE 115*a* may consider initiator UE 115*b* as a candidate for COT sharing after T seconds after the previous COT sharing request received from initiator UE 115*b*.

In aspects, based on a determination to request COT sharing from initiator UE 115*b*, transmitting UE 115*a* may configure COT sharing request 370 to transmit to initiator UE 115*b*. COT sharing request 370 may be configured to include various information to enable initiator UE 115*b* to determine that transmitting UE 115*a* is requesting COT sharing, as well as to enable initiator UE 115*b* to, in some aspects, determine parameters for acquiring the COT to be shared with transmitting UE 115*a*.

In some aspects, COT sharing request 370 may be included in a second-stage SCI message transmitted to initiator UE 115*b* from transmitting UE 115*a*. The second-stage SCI message may include a new field, which may be called a COT sharing request field, and may be used to indicate whether a COT sharing requests is requested. In some aspects, the COT sharing request may be a one-bit field, and a first value (e.g., a zero) may indicate that no COT sharing is request by the transmitting UE, and a second value (e.g., a one) may indicate that COT sharing is request by the transmitting UE. In this manner, transmitting UE 115*a* may include a one in the COT sharing field of the second-stage SCI message in indicate to initiator UE 115*b* that transmitting UE 115*a* is requesting COT sharing from initiator UE 115*b*. In these aspects, initiator UE 115*b* may determine to acquire and share a COT for sharing with transmitting UE 115*a*, but the parameters for acquiring the COT to access the sidelink channel within the shared spectrum may be determined and/or selected by initiator UE 115*b*.

In alternative or additional aspects, a higher layer parameter (e.g., a higher layer parameter referred to as sl-enableCotSharingRequest) may be used to indicate whether a COT sharing field is present in the second-stage SCI message transmitted to initiator UE 115*b* from transmitting UE 115*a*. The sl-enableCotSharingRequest parameter may be transmitted to initiator UE 115*b* from transmitting UE 115*a* via a radio resource control (RRC) or a medium access control (MAC)-control element (CE) message. In some aspects, a first value (e.g., a zero) in the sl-enableCotSharingRequest parameter may indicate to initiator UE 115*b* that no COT sharing field is present in the second-stage SCI message transmitted to initiator UE 115*b* from transmitting UE 115*a*. However, a second value (e.g., a one) in the sl-enableCotSharingRequest parameter may indicate to initiator UE 115*b* that a COT sharing field is present in the second-stage SCI message transmitted to initiator UE 115*b* from transmitting UE 115*a*. In this case, the second value in the sl-enableCotSharingRequest parameter may also indicate that the COT sharing field includes more than one bit, and that the value in the COT sharing field indicates a number of different types of a channel access priority classes (CAPCs). In aspects, transmitting UE 115*a* may also indicate to initiator UE 115*b* one of the CAPC types to perform, when acquiring the COT, a Cat4 LBT procedure to acquire the COT according to the selected CAPC. In some aspects, the sl-enableCotSharingRequest parameter transmission (e.g., RRC or MAC-CE) may be received by other sidelink UEs (other than initiator UE 115*b*). In this case, the other sidelink UEs may store an ID of transmitting UE 115*a* (e.g., based on the source ID of the COT sharing request 370) to maintain a list of which sidelink UEs enabled a COT sharing request function.

It is noted that, as the second-stage SCI message includes a source ID and a destination ID, a sidelink UE receiving COT sharing request 370 may, after decoding the second-stage SCI message, know to which UE the COT sharing request is intended based on the destination ID, and which UE requested the COT sharing based on the source ID. In this manner, a sidelink UE receiving COT sharing request 370 may determine whether the COT sharing request is intended for itself or for another sidelink UE.

In aspects, COT sharing request 370 may be a sidelink transmission that includes an indication of the data buffer intended for transmission by transmitting UE 115*a* to the receiving UE over the sidelink channel. The indication of the data buffer may be, or may be included in, a buffer status report (BSR) transmitted to initiator UE 115*b*. The sidelink transmission may also include an indication of a maximum number of COTs that the initiator UE 115*b* is to acquire. In aspects, initiator UE 115*b* may maintain a running count of the size of transmitting UE 115*a*'s BSR. In this manner, initiator UE 115*b* may update transmitting UE 115*a*'s BSR based on the size of the received BSR (e.g., the number of bits in the received BSR). In aspects, when the size of the BSR is greater than zero, initiator UE 115*b* may acquire (and/or share) a new COT automatically. In this manner, the BSR transmission may serve as a COT sharing request, as initiator UE 115*b* may initiate and share a COT automatically. However, if the new COT to be acquired results in the total number of acquired COTs being equal to the indicated maximum number of COTs in the sidelink transmission, initiator UE 115*b* may not acquire the new COT. In aspects, if initiator UE 115*b* is not the receiving UE (e.g., the UE that is to receive the data transmission from transmitting UE 115*a* over the shared COT), then transmitting UE 115*a* may update the BSR to initiator UE 115*b* at the end of each COT.

In aspects, the sidelink transmission may also include a channel occupancy measurement as measured by transmitting UE 115*a*. As noted above, the channel occupancy measurement may indicate a percentage of samples whose RSSI measurement is above a threshold RSSI value, and may be used to determine whether the probability of LBT success of transmitting UE 115*a* is high or low. In this manner, based on the received channel occupancy measurement in COT sharing request 370, initiator UE 115*b* may determine whether transmitting UE 115*a* has a higher or lower LBT success probability than the LBT success probability of initiator UE 115*b*. In these aspects, the source ID (e.g., the ID of transmitting UE 115*a*) and the destination ID (e.g., the ID of initiator UE 115*b*) may be obtained from the second-stage SCI message.

During operation of wireless communications system 300, transmitting UE 115*a* transmits COT sharing request 370 to initiator UE 115*b*. In aspects, transmitting UE 115*a* transmits COT sharing request 370 to initiator UE 115*b* may include transmitting UE 115*a* performing a category 2 (Cat2) LBT procedure in order to obtain access to the sidelink channel within the shared spectrum to transmit COT sharing request 370 to initiator UE 115*b*. In some aspects, UE transmitting UE 115*a* may perform a Cat4 LBT procedure in order to obtain access to the sidelink channel within the shared spectrum to transmit COT sharing request 370 to initiator UE 115*b*. In aspects, the Cat4 LBT procedure may be performed by transmitting UE 115*a* with a higher energy threshold than typically performed, with a smaller contention window size than typically performed, or a combination thereof.

In aspects, transmitting COT sharing request 370 to initiator UE 115*b* may include transmitting UE 115*a* routing COT sharing request 370 through a base station. In these cases, transmitting UE 115*a* and initiator UE 115*b* may both be within coverage of the base station and the access link (Uu) to the base station may be in a licensed spectrum. In these cases, transmitting UE 115*a* may transmit COT sharing request 370 to the base station, and the base station may forward COT sharing request 370 to initiator UE 115*b*.

In aspects, carrier aggregation may be implemented, and a primary cell in a licensed band and a secondary cell in an unlicensed band may be implemented. In these cases, transmitting UE 115*a* may transmit COT sharing request 370 to initiator UE 115*b* in the primary cell.

In some aspects, transmitting UE 115*a* may transmit COT sharing request 370 to initiator UE 115*b* without performing sensing on the transmission channel. In this case, transmitting UE 115*a* may use short control signaling to transmit COT sharing request 370 to initiator UE 115*b*. In aspects, short control signaling may include transmissions in which a UE may transmit management and control frames over a communication channel without performing sensing of the communication channel for the presence of other signals.

During operation of wireless communications system 300, initiator UE 115*b* receives COT sharing request 370. Initiator UE 115*b*, in response to receiving COT sharing request 370 from transmitting UE 115*a*, may determine whether to initiate COT sharing with transmitting UE 115*a*. As mentioned above, initiator UE 115*b* may determine that transmitting UE 115*a* is requesting COT sharing based on the source ID received in a second-stage SCI message associated with COT sharing request 370. Initiator UE 115*b* may determine to initiate COT sharing with transmitting UE 115*a* based on COT sharing request 370. In alternative or additional aspects, initiator UE 115*b* may determine to initiate COT sharing with transmitting UE 115*a* based on a determination that initiator UE 115*b* has a higher probability of LBT success than transmitting UE 115*a* (e.g., based on the channel occupancy measurements of both transmitting UE 115*a* and initiator UE 115*b*, as described above).

Based on a determination to initiate COT sharing with transmitting UE 115*a*, initiator UE 115*b* may acquire a COT to access a sidelink channel within the shared spectrum. In aspects, initiator UE 115*b* may acquire the COT even though initiator UE 115*b* does not have data to transmit during the COT. In this manner, initiator UE 115*b* may acquire the COT is exclusively for sharing the COT with transmitting UE 115*a*.

Initiator UE 115*b* may transmit COT sharing information 375 to transmitting UE 115*a*. COT sharing information 375 may be configured to facilitate access to the COT by transmitting UE 115*a*. In aspects, COT sharing information 375 may be included in an SCI message transmitted from initiator UE 115*b* to transmitting UE 115*a* and may include information such as a duration of the COT, an end time of the COT, gap periods within the COT for a responding sidelink UE to perform an LBT prior to joining the COT, a priority (e.g., a CAPC) used by initiator UE 115*b* for acquiring the COT, slot information, etc.

In aspects, transmitting UE 115*a*, may receive COT sharing information 375 and may determine to access a sidelink channel during the shared COT to transmit data transmission 380 to a receiving UE. In some aspects, it may be determined that a gap between transmission from transmitting UE 115*a* and a transmission from initiator UE 115*b* is greater than a predetermined threshold. In this case, transmitting UE 115*a* may, prior to accessing the channel during the shared COT, perform a Cat2 LBT procedure in order to access the shared spectrum to access the sidelink channel during the shared COT. Transmitting UE 115*a* may use a cyclic prefix (CP) extension feature (e.g., a CP extension from NR-U) in order to adjust and generate a correct gap to compensate for the gap greater than the threshold for COT sharing.

During operation of wireless communications system 300, transmitting UE 115*a* transmits data transmission 380 over the sidelink channel during the shared COT. In aspects, data transmission 380 may be a data transmission to initiator UE 115*b*, or may be a data transmission to another sidelink UE. In some aspects, transmitting UE 115*a* may transmit data transmission 380 to another sidelink UE (e.g., a sidelink UE that is not initiator UE 115*b*) when the another sidelink UE is an eligible sidelink UE. In aspects, an eligible sidelink UE is a sidelink UE to which only non-user plane data is to be transmitted. In some aspects, all sidelink UEs may be eligible sidelink UEs.

Figure 4:
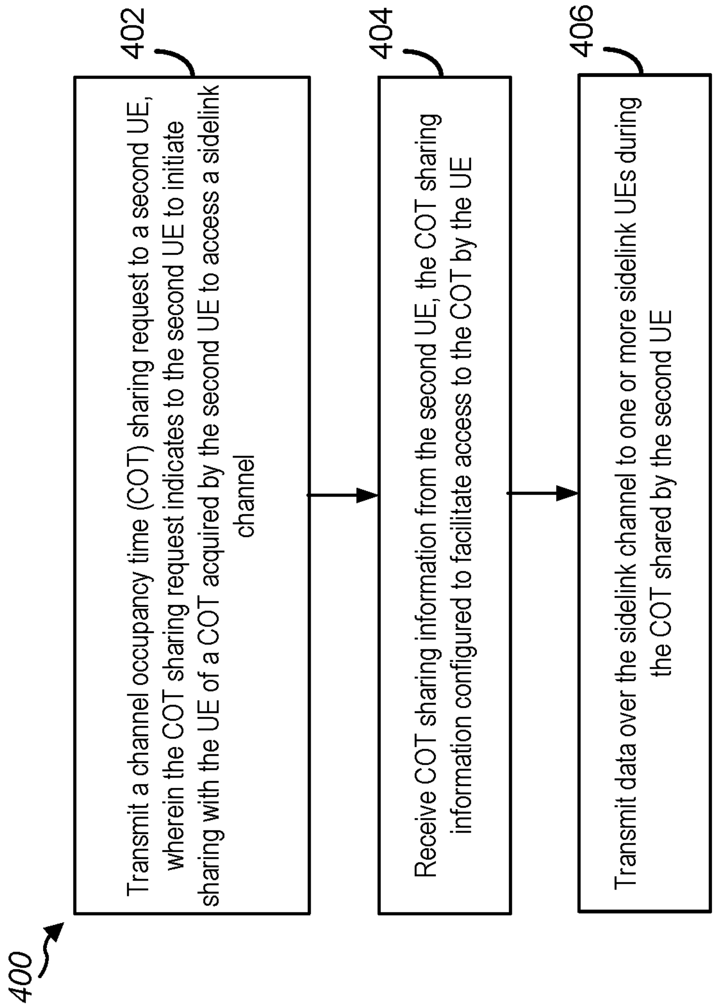
FIG. 4 is a flow diagram illustrating an example process that supports mechanisms for sidelink COT sharing request signaling in a wireless communication system according to one or more aspects.
Figure 6:
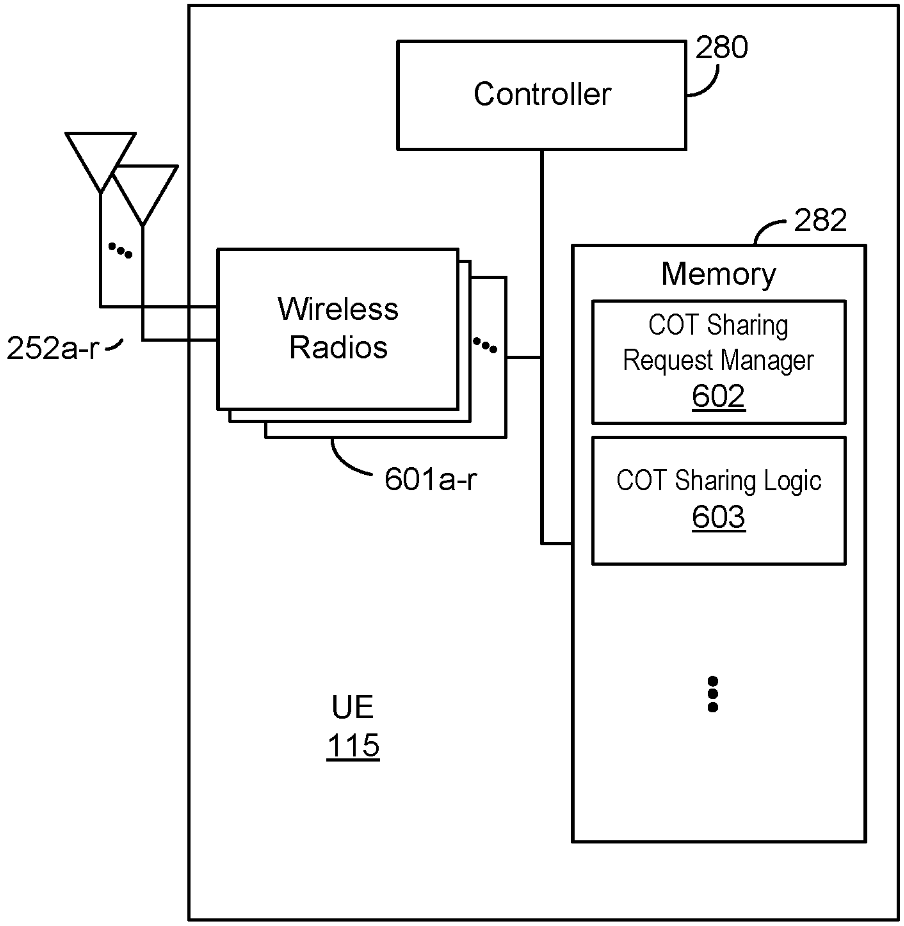
FIG. 6 is a block diagram of an example UE that supports mechanisms for sidelink COT sharing request signaling according to one or more aspects.

FIG. 4 is a flow diagram illustrating an example process 400 that provides a mechanism for sidelink COT sharing request signaling in a wireless communication system according to one or more aspects. Operations of process 400 may be performed by a UE, such as transmitting UE 115*a* described above with reference to FIGS. 1-3. For example, example operations (also referred to as "blocks") of process 400 may enable UE 115 to support mechanisms for sidelink COT sharing request signaling. FIG. 6 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601*a-r* and antennas 252*a-r*. Wireless radios 601*a-r* includes various components and hardware, as illustrated in FIG. 2, including modulator/demodulators 254*a-r*, MIMO detector 256, receive processor 258, transmit processor 264, and TX MIMO processor 266.

At block 402 of process 400, a UE (e.g., transmitting UE 115*a*) transmits a COT sharing request to a second UE (e.g., initiator UE 115*b*). In order to implement the functionality for such operations, the UE, under control of controller/processor 280, executes COT sharing request manager 602, stored in memory 282. The functionality implemented through the execution environment of COT sharing request manager 602 allows for the UE to perform COT sharing request generation and transmission operations according to the various aspects herein. In aspects, the COT sharing request may indicate to the second UE to initiate sharing of a COT acquired by the second UE to access a sidelink channel. In some aspects, the second UE may acquire the COT exclusively for sharing the COT with the UE, and the second UE may not actually have any data to transmit during the COT.

In aspects, the UE may be a poorly-placed UE having a low probability of a successful LBT procedure to acquire a COT to access the sidelink channel, and the second UE may be a well-placed UE having a high probability of a successful LBT procedure to acquire a COT to access the sidelink channel. For example, the UE may determine a channel occupancy associated with the UE (e.g., based on a percentage of samples of received signals received by the UE from other sidelink UEs whose RSSI is higher than a threshold), and may determine that the channel occupancy exceeds a predetermined threshold. In some aspects, the UE and the second UE may exchange indications of respective channel occupancy measurements. For example, the UE may transmit an indication of a channel occupancy of the UE to the second UE, and/or the second UE may transmit an indication of a channel occupancy of the second UE to the UE.

Based on the determination that the channel occupancy of the UE exceeds the predetermined threshold, the UE may be determined to be a poorly-placed UE, and the UE may determine to generate and/or transmit the COT sharing request to the second UE. In some aspects, the UE may alternatively or additionally determine that the second UE is a well-placed UE, in which case the UE may determine to send the COT sharing request to the second UE, or may determine that the second UE is also poorly-placed UE, in which case the UE may determine to forego sending the COT sharing request to the second UE. In some aspects, the UE may transmit the COT sharing request to the second UE without determining whether the second UE is a well-placed UE or a poorly-placed UE, and/or without determining whether the UE is a well-placed UE or a poorly-placed UE. In some embodiments, the UE may not be a poorly placed UE, and/or the second UE may not be a well-placed UE.

In some aspects, the UE may maintain a blacklist that includes information about any sidelink UE from which a COT sharing request has been received. A COT sharing request from a sidelink UE may indicate that the sidelink UE has a low probability of LBT success, and thus a low probability of acquiring a COT to access a sidelink channel within the shared spectrum. In this manner, a sidelink UE may maintain a blacklist of sidelink UEs with a low probability of LBT success and thus, a blacklist of poorly-placed UEs. In these aspects, the UE may receive one or more COT sharing requests from one or more sidelink UEs, respectively. The UE may store an indication of the one or more UEs from which the one or more COT sharing requests are received. The UE may determine whether the second UE is a UE of the one or more UEs for which an indication of a received COT sharing request has been stored in the UE. The UE may determine to transmit the COT sharing request to the second UE in response to a determination that the second UE is not a UE of the one or more UEs from which one or more COT sharing requests have been received by the UE. On the other hand, the UE may determine to forego transmitting the COT sharing request to the second UE in response to a determination that the second UE is a UE of the one or more UEs from which one or more COT sharing requests have been received by the UE.

In aspects, the COT sharing request may be included in a COT sharing request field of a second-stage SCI message transmitted to the second UE by the UE. The COT sharing request may include a one-bit indication indicating whether the second UE is to initiate COT sharing or not. For example, a one in the COT sharing request field may indicate to the second UE to initiate COT sharing with the UE, whereas a zero in the COT sharing request field may indicate to the second UE not to initiate COT sharing with the UE. In this manner, a one in the in the COT sharing request field may serve as a COT sharing request, whereas a zero in the COT sharing request field may serve as not COT sharing request.

In aspects, a higher layer parameter may be transmitted over the sidelink to the second UE to indicate whether the COT sharing request field is included in the second-stage SCI message or not. In these aspects, a first value of the higher layer parameter may indicate that the second UE is not to initiate sharing of the COT with the UE, and a second value of the higher layer parameter may indicate that the COT sharing request includes an indication of a plurality of CAPCs from which the second UE is to select to use for acquiring the COT.

In aspects, the COT sharing request may include a BSR of the UE. The BSR of the UE may indicate a buffer of the data that the UE is to transmit over the sidelink channel to the one or more sidelink UEs during the shared COT. The COT sharing request may include an indication of a maximum number of COTs that the second UE is to acquire, and the second UE may be configured to acquire a COT when the BSR is greater than zero if a number of COTs acquired by the second UE to share with the UE is less than the maximum number of COTs. In aspects, when the second UE is not a UE to which the UE is to transmit the data during the COT, the UE may transmit an update of the BSR to the second UE at the end of each COT.

In aspects, the UE transmitting the COT sharing request to the second UE may include the UE performing a Cat2 LBT procedure to win access to the transmission medium, performing a Cat4 LBT procedure with a high energy threshold to win access to the transmission medium, performing a Cat4 LBT procedure with a small contention window size to win access to the transmission medium, transmitting the COT sharing request to a base station configured to relay the COT sharing request to the second UE, transmitting the COT sharing request to the second UE in a primary cell of the second UE in a licensed band (where the second UE is configured with a plurality of carriers and the primary cell is one of those carriers), and/or transmitting the COT sharing request to the second UE using short signaling without performing sensing of the sidelink channel.

At block 404 of process 400, the UE (e.g., transmitting UE 115*a*) receives COT sharing information from the second UE. In order to implement the functionality for such operations, UE 115, under control of controller/processor 280, may receive COT sharing information from the second UE via wireless radios 601*a-r* and antennas 252*a-r*. In aspects, the COT sharing information configured to facilitate access to the COT by the UE.

At block 406 of process 400, the UE (e.g., transmitting UE 115*a*) transmits data over the sidelink channel to one or more sidelink UEs during the COT shared by the second UE. In order to implement the functionality for such operations, UE 115, under control of controller/processor 280, may transmit the data over the sidelink channel to one or more sidelink UEs during the COT shared by the second UE via wireless radios 601*a-r* and antennas 252*a-r*.

In aspects, transmitting, by the UE, the data over the sidelink channel to the one or more sidelink UEs during the shared COT may include performing a Cat2 LBT on the medium when a gap between transmissions of the UE and transmissions of the second UE is greater than a predetermined threshold. In these aspects, the UE may use a CP extension to compensate for the gap being greater than the predetermined threshold.

Figure 5:
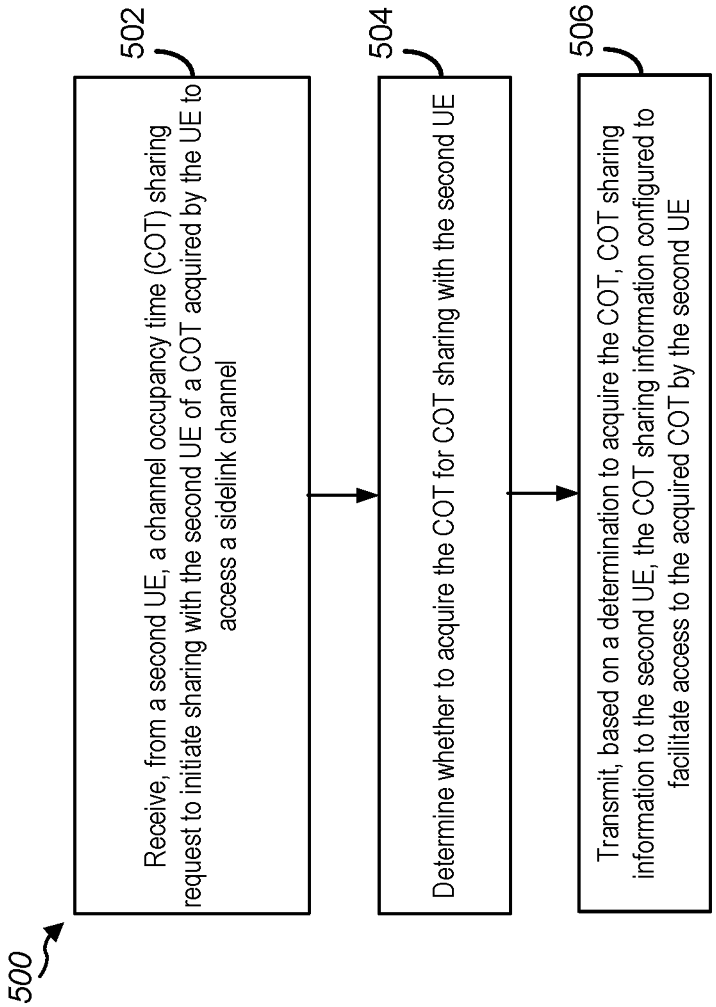
FIG. 5 is a flow diagram illustrating another example process that supports mechanisms for sidelink COT sharing request signaling in a wireless communication system according to one or more aspects.

FIG. 5 is a flow diagram illustrating an example process 500 that provides a mechanism for sidelink COT sharing request signaling in a wireless communication system according to one or more aspects. Operations of process 500 may be performed by a UE, such as initiator UE 115*b* described above with reference to FIGS. 1-3. For example, example operations (also referred to as "blocks") of process 500 may enable UE 115 to support mechanisms for sidelink COT sharing request signaling.

At block 502 of process 500, a UE (e.g., initiator UE 115*b*) receives a COT sharing request from a second UE (e.g., transmitting UE 115*a*). In order to implement the functionality for such operations, UE 115, under control of controller/processor 280, may receive COT sharing information from the second UE via wireless radios 601*a-r* and antennas 252*a-r*.

In aspects, the COT sharing request may indicate to the UE to initiate sharing of a COT acquired by the UE. The UE may not actually have any data to transmit during the COT, and may acquire the COT exclusively for sharing the COT with the second UE.

In aspects, the COT sharing request may be included in a COT sharing request field of a second-stage SCI message transmitted from the second UE to the UE. The COT sharing request may include a one-bit indication indicating whether the UE is to initiate COT sharing or not. For example, a one in the COT sharing request field may indicate to the UE to initiate COT sharing with the second UE, whereas a zero in the COT sharing request field may indicate to the UE not to initiate COT sharing with the second UE. In this manner, a one in the in the COT sharing request field may serve as a COT sharing request, whereas a zero in the COT sharing request field may serve as not COT sharing request.

In aspects, a higher layer parameter may be transmitted over the sidelink to the second UE to indicate whether the COT sharing request field is included in the second-stage SCI message or not. In these aspects, a first value of the higher layer parameter may indicate that the UE is not to initiate sharing of the COT with the second UE, and a second value of the higher layer parameter may indicate that the COT sharing request includes an indication of a plurality of CAPCs from which the UE is to select to use for acquiring the COT.

In aspects, the COT sharing request may include a BSR of the second UE. The BSR of the second UE may indicate a buffer of the data that the second UE is to transmit over the sidelink channel to the one or more sidelink UEs during the shared COT. The COT sharing request may include an indication of a maximum number of COTs that the UE is to acquire, and the UE may be configured to acquire a COT when the BSR is greater than zero if a number of COTs acquired by the UE to share with the second UE is less than the maximum number of COTs. In aspects, when the UE is not a UE to which the second UE is to transmit the data during the COT, the second UE may transmit an update of the BSR to the UE at the end of each COT.

At block 504 of process 400, the UE (e.g., initiator UE 115*b*) determines whether to acquire the COT for COT sharing with the second UE. In order to implement the functionality for such operations, the UE, under control of controller/processor 280, executes COT sharing logic 603, stored in memory 282. The functionality implemented through the execution environment of COT sharing logic 603 allows for the UE to perform operations for determining whether to acquire a COT and/or to initiate COT sharing with the second UE COT according to the various aspects herein. In aspects, as noted above, the UE may not actually have any data to transmit during the COT, and may determine to acquire the COT exclusively for sharing the COT with the second UE.

In aspects, the UE may determine to acquire and/or share the COT based, at least in part, on the received COT sharing request, a determination that the second UE is a poorly-placed UE, and/or a determination that the UE is a well-placed UE. In particular, the UE may determine whether a probability of acquiring the COT by the UE is higher or lower than a probability of acquiring the COT by the second UE. The UE may determine to acquire and/or share the COT with the second UE in response to a determination that the probability of acquiring the COT by the UE is higher than the probability of acquiring the COT by the second UE. On the other hand, the UE may forego acquiring the COT and/or initiating COT sharing in response to a determination that the probability of acquiring the COT by the UE is not higher than the probability of acquiring the COT by the second UE.

For example, the UE and the second UE may exchange indications of respective channel occupancy measurements. The UE may determine whether the probability of acquiring the COT by the UE is higher or lower than the probability of acquiring the COT by the second UE based, at least in part, on the channel occupancy of the UE and the second UE. For example, the UE may determine, based on the channel occupancy received from the second UE and/or based on the channel occupancy of the UE, that the UE has a higher probability of winning an LBT for acquiring the COT than the probability of the second UE. In this case, the UE may determine to acquire the COT and initiate COT sharing with the second UE. However, the UE may determine, based on the channel occupancy received from the second UE and/or based on the channel occupancy of the UE, that the UE has a lower probability of winning an LBT for acquiring the COT than the probability of the second UE. In this case, the UE may determine to forego acquiring the COT and/or initiating COT sharing with the second UE.

In some aspects, the UE may maintain a blacklist that includes information about any sidelink UE from which a COT sharing request has been received by the UE. In this manner, the UE may maintain a blacklist of sidelink UEs with a low probability of LBT success. In these aspects, the UE may determine whether the probability of acquiring the COT by the UE is higher or lower than the probability of acquiring the COT by the second UE based, at least in part, on the blacklist.

At block 506 of process 500, the UE (e.g., initiator UE 115*b*) transmits, based on a determination to acquire the COT, COT sharing information to the second UE. In order to implement the functionality for such operations, UE 115, under control of controller/processor 280, may transmit COT sharing information to the second UE via wireless radios 601*a-r* and antennas 252*a-r*. In aspects, the COT sharing information may be configured to facilitate access to the acquired COT by the second UE.

In aspects, the COT sharing information may be included in an SCI message transmitted from the UE to the second UE, and may include information such as a duration of the COT, an end time of the COT, gap periods within the COT for a responding sidelink UE to perform an LBT prior to joining the COT, a priority (e.g., a CAPC) used by the UE for acquiring the COT, slot information, etc.

In one or more aspects, techniques for supporting mechanisms for sidelink COT sharing request signaling in a wireless communication system according to one or more aspects may include additional aspects, such as any single aspect or any combination of aspects described below or in connection with one or more other processes or devices described elsewhere herein. In a first aspect, supporting mechanisms for sidelink COT sharing request signaling in a wireless communication system may include an apparatus configured to transmit a COT sharing request to a second UE. In this aspect, the COT sharing request indicates to the second UE to initiate sharing with the UE of a COT acquired by the second UE to access a sidelink channel. The apparatus is further configured to receive COT sharing information from the second UE, the COT sharing information configured to facilitate access to the COT by the UE, and to transmit data during the COT over the sidelink channel to one or more sidelink UEs. Additionally, the apparatus may perform or operate according to one or more aspects as described below. In some implementations, the apparatus includes a wireless device, such as a UE (e.g., a transmitting UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the UE is a poorly-placed UE having a low probability of a successful LBT procedure to acquire a COT to access the sidelink channel.

In a third aspect, alone or in combination with one or more of the first aspect or the second aspect, the second UE is a well-placed UE having a high probability of successful LBT procedure to acquire a COT to access the sidelink channel.

In a fourth aspect, alone or in combination with one or more of the first aspect through the third aspect, the techniques of the first aspect include receiving a channel occupancy indication of the second UE, the channel occupancy indicating a percentage of receive samples measured by the second UE where a receive signal strength indicator (RSSI) is above a preconfigured threshold, or transmitting a channel occupancy indication of the UE, the UE being configured to determine whether the second UE has a higher probability of a successful LBT procedure to acquire the COT to access the sidelink channel than the UE based on the channel occupancy of the UE and the channel occupancy of the second UE.

In a fifth aspect, alone or in combination with one or more of the first aspect through the fourth aspect, the techniques of the first aspect include receiving one or more COT sharing requests from one or more UEs, respectively.

In a sixth aspect, alone or in combination the fifth aspect, the techniques of the first aspect include storing an indication of the one or more UEs from which the one or more COT sharing requests are received.

In a seventh aspect, alone or in combination with one or more of the fifth aspect through the sixth aspect, the techniques of the first aspect include determining whether the second UE is a UE of the one or more UEs.

In an eighth aspect, alone or in combination with one or more of the fifth aspect through the seventh aspect, the techniques of the first aspect include transmitting the COT sharing request to the second UE in response to a determination that the second UE is not a UE of the one or more UEs from which the one or more COT sharing requests are received.

In a ninth aspect, alone or in combination with one or more of the fifth aspect through the eighth aspect, the techniques of the first aspect include foregoing transmitting the COT sharing request to the second UE in response to a determination that the second UE is a UE of the one or more UEs from which the one or more COT sharing requests are received.

In a tenth aspect, alone or in combination with one or more of the first aspect through the ninth aspect, the second UE has no data to transmit during the COT and acquires the COT exclusively for sharing the COT with the UE.

In an eleventh aspect, alone or in combination with one or more of the first aspect through the tenth aspect, the COT sharing request is included in a COT sharing request field of a second stage SCI message transmitted to the second UE.

In a twelfth aspect, alone or in combination with one or more of the first aspect through the eleventh aspect, the COT sharing request includes a one-bit indication.

In a thirteenth aspect, alone or in combination with the twelfth aspect, a first value of the one-bit indication indicates that the second UE is not to initiate sharing of the COT with the UE.

In a fourteenth aspect, alone or in combination with one or more of the twelfth aspect through the thirteenth aspect, a second value of the one-bit indication indicates that the second UE is to initiate sharing of the COT with the UE.

In a fifteenth aspect, alone or in combination with the fourteenth aspect, the second UE is configured to determine parameters for acquiring the COT.

In a sixteenth aspect, alone or in combination with one or more of the first aspect through the fifteenth aspect, a higher layer parameter transmitted over the sidelink interface to the second UE indicates whether the COT sharing request field is included in the second stage SCI message or not.

In a seventeenth aspect, alone or in combination with the sixteenth aspect, a first value of the higher layer parameter indicates that the second UE is not to initiate sharing of the COT with the UE.

In an eighteenth aspect, alone or in combination with one or more of the sixteenth aspect through the seventeenth aspect, a second value of the higher layer parameter indicate that the COT sharing request includes an indication of a plurality of CAPCs from which the second UE is to select to use for acquiring the COT.

In a nineteenth aspect, alone or in combination with one or more of the first aspect through the eighteenth aspect, the COT sharing request includes a BSR indicating a buffer of the data that the UE is to transmit during the COT over the sidelink channel to the one or more sidelink UEs.

In a twentieth aspect, alone or in combination with one or more of the first aspect through the nineteenth aspect, the COT sharing request includes an indication of a maximum number of COTs that the second UE is to acquire.

In a twenty-first aspect, alone or in combination with the twentieth aspect, the second UE is configured to acquire the COT when the BSR is greater than zero if a number of COTs acquired by the second UE to share with the UE is less than the maximum number of COTs.

In a twenty-second aspect, alone or in combination with one or more of the twentieth aspect through the twenty-first aspect, the UE transmits an update of the BSR to the second UE at the end of each COT when the second UE is not included in the one or more sidelink UEs to which the UE transmit the data during the COT.

In a twenty-third aspect, alone or in combination with one or more of the first aspect through the twenty-second aspect, the COT sharing request includes an indication of a channel occupancy of the UE.

In a twenty-fourth aspect, alone or in combination with the twenty-third aspect, the channel occupancy indicates a percentage of receive samples measured by the UE where an RSSI is above a preconfigured threshold.

In a twenty-fifth aspect, alone or in combination with one or more of the first aspect through the twenty-fourth aspect, transmitting the COT sharing request includes performing a Cat2 LBT procedure to access the sidelink channel to transmit the COT sharing request to the second UE, performing a Cat4 LBT procedure with a high energy threshold to access the sidelink channel to transmit the COT sharing request to the second UE, performing a Cat4 LBT procedure with a small contention window size to access the sidelink channel to transmit the COT sharing request to the second UE, transmitting the COT sharing request to a base station configured to transmit the COT sharing request to the second UE, transmitting the COT sharing request to the second UE in a primary cell of the second UE, where the primary cell is in a licensed band and the is one carrier of a plurality of carriers configured for the second UE, and/or transmitting the COT sharing request to the second UE using short signaling without performing sensing of the sidelink channel.

In a twenty-sixth aspect, alone or in combination with one or more of the first aspect through the twenty-fifth aspect, transmitting the data during the COT over the sidelink channel to the one or more sidelink UEs includes performing a Cat2 LBT when a gap between transmissions of the UE and transmissions of the second UE is greater than a predetermined threshold.

In a twenty-seventh aspect, alone or in combination with the twenty-sixth aspect, transmitting the data during the COT over the sidelink channel to the one or more sidelink UEs includes using a CP extension to compensate for the gap being greater than the predetermined threshold.

In a twenty-eighth aspect, techniques for supporting mechanisms for sidelink COT sharing request signaling in a wireless communication system may include an apparatus configured to receive, from a second UE, a COT sharing request to initiate sharing with the second UE of a COT acquired by the UE to access a sidelink channel, to determine to acquire the COT for accessing the sidelink channel, and to transmit COT sharing information to the second UE. In aspects, the COT sharing information is configured to facilitate access to the acquired COT by the second UE. Additionally, the apparatus may perform or operate according to one or more aspects as described below. In some implementations, the apparatus includes a wireless device, such as a UE (e.g., an initiator UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-ninth aspect, alone or in combination with one or more of the twenty-eighth aspect through the twenty-eighth aspect, the second UE is a poorly-placed UE having a low probability of a successful LBT procedure to acquire the COT to access the sidelink channel.

In a thirtieth aspect, alone or in combination with one or more of the twenty-eighth aspect through the twenty-ninth aspect, the UE is a well-placed UE having a high probability of successful LBT procedure to acquire the COT to access the sidelink channel.

In a thirty-first aspect, alone or in combination with one or more of the twenty-eighth aspect through the thirtieth aspect, the techniques of the twenty-eight aspect include transmitting a channel occupancy indication to the second UE, the channel occupancy indicating a percentage of receive samples measured by the UE where a RSSI is above a preconfigured threshold.

In a thirty-second aspect, alone or in combination with the thirty-first aspect, the techniques of the twenty-eight aspect include receiving a channel occupancy indication of the second UE.

In a thirty-third aspect, alone or in combination with one or more of the thirty-first aspect through the thirty-second aspect, the techniques of the twenty-eight aspect include determining whether the UE has a higher probability of a successful LBT procedure to acquire the COT to access the sidelink channel than the second UE based on the channel occupancy of the UE and the channel occupancy of the second UE.

In a thirty-fourth aspect, alone or in combination with one or more of the twenty-eighth aspect through the thirty-third aspect, the techniques of the twenty-eight aspect include receiving one or more COT sharing requests from one or more UEs, respectively.

In a thirty-fifth aspect, alone or in combination with the thirty-fourth aspect, the techniques of the twenty-eight aspect include storing an indication of the one or more UEs from which the one or more COT sharing requests are received.

In a thirty-sixth aspect, alone or in combination with one or more of the thirty-fourth aspect through the thirty-fifth aspect, the techniques of the twenty-eight aspect include determining whether the second UE is a UE of the one or more UEs.

In a thirty-seventh aspect, alone or in combination with one or more of the thirty-fourth aspect through the thirty-sixth aspect, the techniques of the twenty-eight aspect include acquiring the COT in response in response to a determination that the second UE is not a UE of the one or more UEs from which the one or more COT sharing requests are received.

In a thirty-eighth aspect, alone or in combination with one or more of the thirty-fourth aspect through the thirty-seventh aspect, the techniques of the twenty-eight aspect include foregoing acquiring the COT in response to a determination that the second UE is a UE of the one or more UEs from which the one or more COT sharing requests are received.

In a thirty-ninth aspect, alone or in combination with one or more of the twenty-eighth aspect through the thirty-eighth aspect, the UE has no data to transmit and acquires the COT exclusively for sharing the COT with the second UE.

In a fortieth aspect, alone or in combination with one or more of the twenty-eighth aspect through the thirty-ninth aspect, the COT sharing request is included in a COT sharing request field of a second stage SCI message transmitted to the UE.

In a forty-first aspect, alone or in combination with one or more of the twenty-eighth aspect through the fortieth aspect, the COT sharing request includes a one-bit indication.

In a forty-second aspect, alone or in combination with the forty-first aspect, a first value of the one-bit indication indicates that the UE is not to initiate sharing of the COT with the second UE.

In a forty-third aspect, alone or in combination with one or more of the forty-first aspect through the forty-second aspect, a second value of the one-bit indication indicates that the UE is to initiate sharing of the COT with the second UE.

In a forty-fourth aspect, alone or in combination with one or more of the forty-first aspect through the forty-third aspect, the UE is configured to determine parameters for acquiring the COT.

In a forty-fifth aspect, alone or in combination with one or more of the twenty-eighth aspect through the forty-fourth aspect, higher layer parameter received over the sidelink interface from the second UE indicates whether the COT sharing request field is included in the second stage SCI message or not.

In a forty-sixth aspect, alone or in combination with one or more of the twenty-eighth aspect through the forty-fifth aspect, a first vale of the higher layer parameter indicates that the UE is not to initiate sharing of the COT with the second UE.

In a forty-seventh aspect, alone or in combination with the forty-sixth aspect, a second value of the higher layer parameter indicate that the COT sharing request includes an indication of a plurality of CAPCs from which the UE is to select to use for acquiring the COT.

In a forty-eighth aspect, alone or in combination with one or more of the twenty-eighth aspect through the forty-seventh aspect, the COT sharing request includes a BSR indicating a buffer of the data that the second UE is to transmit during the COT over the sidelink channel to one or more sidelink UEs.

In a forty-ninth aspect, alone or in combination with one or more of the twenty-eighth aspect through the forty-eighth aspect, the COT sharing request includes an indication of a maximum number of COTs that the UE is to acquire.

In a fiftieth aspect, alone or in combination with the forty-ninth aspect, the UE is configured to acquire the COT when the BSR is greater than zero if a number of COTs acquired by the UE to share with the second UE is less than the maximum number of COTs.

In a fifty-first aspect, alone or in combination with one or more of the forty-ninth aspect through the fiftieth aspect, the UE receives an update of the BSR from the second UE at the end of each COT when the UE is not included in the one or more sidelink UEs to which the second UE transmits the data during the COT.

In a fifty-second aspect, alone or in combination with one or more of the twenty-eighth aspect through the fifty-first aspect, the COT sharing request includes an indication of a channel occupancy of the second UE.

In a fifty-third aspect, alone or in combination with the fifty-second aspect, the channel occupancy indicates a percentage of receive samples measured by the UE where a RSSI is above a preconfigured threshold.

In a fifty-fourth aspect, alone or in combination with one or more of the twenty-eighth aspect through the fifty-third aspect, determining to acquire the COT for accessing the sidelink channel includes determining, based, at least in part, on the COT sharing request, whether a probability of acquiring the COT by the UE is higher or lower than a probability of acquiring the COT by the second UE.

In a fifty-fifth aspect, alone or in combination with the fifty-fourth aspect, determining to acquire the COT for accessing the sidelink channel includes acquiring the COT and initiating COT sharing of the acquired COT with the UE in response to a determination that the probability of acquiring the COT by the UE is higher than the probability of acquiring the COT by the second UE.

In a fifty-sixth aspect, alone or in combination with one or more of the fifty-fourth aspect through the fifty-fifth aspect, determining to acquire the COT for accessing the sidelink channel includes foregoing acquiring the COT and initiating COT sharing in response to a determination that the probability of acquiring the COT by the UE is not higher than the probability of acquiring the COT by the second UE.

In a fifty-seventh aspect, alone or in combination with one or more of the twenty-eighth aspect through the fifty-sixth aspect, receiving the data during the COT over the sidelink channel to the one or more sidelink UEs includes receiving the COT sharing request from the second UE based on the second UE performing a Cat2 LBT when a gap between transmissions of the UE and transmissions of the second UE is greater than a predetermined threshold.

In a fifty-eighth aspect, alone or in combination with the fifty-seventh aspect, receiving the data during the COT over the sidelink channel to the one or more sidelink UEs includes receiving the COT sharing request from the second UE based on the second UE using a CP extension to compensate for the gap being greater than the predetermined threshold.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE), comprising:

at least one processor; and a memory coupled to the at least one processor, storing processor-readable code that, when executed by the at least one processor, is configured to perform operations including:

transmitting a channel occupancy time (COT) sharing request to a second UE, wherein:

the COT sharing request indicates to the second UE to initiate sharing with the UE of a COT acquired by the second UE to access a sidelink channel;

the COT sharing request is included in a COT sharing request field of a second stage sidelink control information (SCI) message; and the COT sharing request includes a buffer status report (BSR) indicating a buffer of data that the UE is to transmit during the COT;

receiving COT sharing information from the second UE, the COT sharing information configured to facilitate access to the COT by the UE; and transmitting the data over the sidelink channel to one or more sidelink UEs during the COT shared by the second UE.

2. The UE of claim 1, wherein the UE is a poorly-placed UE having a low probability of a successful listen-before-talk (LBT) procedure to acquire a COT to access the sidelink channel.

3. The UE of claim 1, wherein the second UE is a well-placed UE having a high probability of successful listen-before-talk (LBT) procedure to acquire a COT to access the sidelink channel.

4. The UE of claim 3, further comprising:

receiving an indication of a channel occupancy of the second UE, the channel occupancy indicating a percentage of receive samples measured by the second UE where a receive signal strength indicator (RSSI) is above a preconfigured threshold; or transmitting, to the second UE, an indication of a channel occupancy of the UE, wherein the UE is configured to determine whether to initiate COT sharing with the UE based on a determination of whether the second UE has a higher probability of a successful LBT procedure to acquire the COT to access the sidelink channel than the UE based on the channel occupancy of the UE and the channel occupancy of the second UE.

5. The UE of claim 3, further comprising:

receiving one or more COT sharing requests from one or more UEs, respectively;

storing an indication of the one or more UEs from which the one or more COT sharing requests are received;

determining whether the second UE is a UE of the one or more UEs;

transmitting the COT sharing request to the second UE in response to a determination that the second UE is not a UE of the one or more UEs from which the one or more COT sharing requests are received; and foregoing transmitting the COT sharing request to the second UE in response to a determination that the second UE is a UE of the one or more UEs from which the one or more COT sharing requests are received.

6. The UE of claim 1, wherein the second UE has no data to transmit during the COT and acquires the COT exclusively for sharing the COT with the UE.

7. The UE of claim 1, wherein the COT sharing request is included in a COT sharing request field of a second stage sidelink control information (SCI) message transmitted to the second UE.

8. The UE of claim 7, wherein the COT sharing request includes a one-bit indication, wherein:

a first value of the one-bit indication indicates that the second UE is not to initiate sharing of the COT with the UE, and a second value of the one-bit indication indicates that the second UE is to initiate sharing of the COT with the UE, wherein the second UE is configured to determine parameters for acquiring the COT.

9. The UE of claim 7, wherein a higher layer parameter transmitted over the sidelink interface to the second UE indicates whether the COT sharing request field is included in the second stage SCI message or not.

10. The UE of claim 9, wherein:

a first value of the higher layer parameter indicates that the second UE is not to initiate sharing of the COT with the UE, and a second value of the higher layer parameter indicate that the COT sharing request includes an indication of a plurality of channel access priority classes (CAPCs) from which the second UE is to select to use for acquiring the COT.

11. The UE of claim 1, wherein the COT sharing request includes a buffer status report (BSR) indicating a buffer of the data that the UE is to transmit during the COT over the sidelink channel to the one or more sidelink UEs.

12. The UE of claim 11, wherein the COT sharing request includes an indication of a maximum number of COTs that the second UE is to acquire, wherein the second UE is configured to acquire the COT when the BSR is greater than zero if a number of COTs acquired by the second UE to share with the UE is less than the maximum number of COTs, wherein the UE transmits an update of the BSR to the second UE at the end of each COT when the second UE is not included in the one or more sidelink UEs to which the UE transmit the data during the COT.

13. The UE of claim 11, wherein the COT sharing request includes an indication of a channel occupancy of the UE, wherein the channel occupancy indicates a percentage of receive samples measured by the UE where a receive signal strength indicator (RSSI) is above a preconfigured threshold.

14. The UE of claim 1, wherein transmitting the COT sharing request includes one or more of:

performing a category 2 (Cat2) listen-before-talk (LBT) procedure to access the sidelink channel to transmit the COT sharing request to the second UE;

performing a category 4 (Cat4) LBT procedure with a high energy threshold to access the sidelink channel to transmit the COT sharing request to the second UE;

performing a Cat4 LBT procedure with a small contention window size to access the sidelink channel to transmit the COT sharing request to the second UE;

transmitting the COT sharing request to a base station configured to transmit the COT sharing request to the second UE;

transmitting the COT sharing request to the second UE in a primary cell, wherein the primary cell is in a licensed band, and wherein the primary cell is one carrier of a plurality of carriers configured for the second UE; or transmitting the COT sharing request to the second UE using short signaling without performing sensing of the sidelink channel.

15. The UE of claim 1, wherein transmitting the data during the COT over the sidelink channel to the one or more sidelink UEs includes:

performing a category 2 (Cat2) listen-before-talk (LBT) when a gap between transmissions of the UE and transmissions of the second UE is greater than a predetermined threshold; and using a cyclic prefix (CP) extension to compensate for the gap being greater than the predetermined threshold.

16. A user equipment (UE), comprising:

at least one processor; and a memory coupled to the at least one processor, storing processor-readable code that, when executed by the at least one processor, is configured to perform operations including:

receiving, from a second UE, a channel occupancy time (COT) sharing request to initiate sharing with the second UE of a COT acquired by the UE to access a sidelink channel, wherein:

the COT sharing request is included in a COT sharing request field of a second stage sidelink control information (SCI) message;

the COT sharing request includes a buffer status report (BSR) indicating a buffer of data that the second UE is to transmit during the COT; and the BSR indicates to the UE whether to acquire the COT for sharing with the second UE;

determining whether to acquire the COT for COT sharing with the second UE; and transmitting, based on a determination to acquire the COT, COT sharing information to the second UE, the COT sharing information configured to facilitate access to the acquired COT by the second UE.

17. The UE of claim 16, further comprising:

transmitting an indication of a channel occupancy of the UE to the second UE, the channel occupancy of the UE indicating a percentage of receive samples measured by the UE where a receive signal strength indicator (RSSI) is above a preconfigured threshold; or receiving an indication of a channel occupancy of the second UE, wherein determining whether to acquire the COT for COT sharing with the second UE includes determining whether the UE has a higher probability of a successful listen-before-talk (LBT) procedure to acquire the COT to access the sidelink channel than the second UE based on the channel occupancy of the UE and the channel occupancy of the second UE.

18. The UE of claim 16, further comprising:

receiving one or more COT sharing requests from one or more UEs, respectively;

storing an indication of the one or more UEs from which the one or more COT sharing requests are received;

determining whether the second UE is a UE of the one or more UEs;

acquiring the COT in response in response to a determination that the second UE is not a UE of the one or more UEs from which the one or more COT sharing requests are received; and foregoing acquiring the COT in response to a determination that the second UE is a UE of the one or more UEs from which the one or more COT sharing requests are received.

19. The UE of claim 16, wherein the UE has no data to transmit during the COT and acquires the COT exclusively for sharing the COT with the second UE.

20. The UE of claim 16, wherein the COT sharing request is included in a COT sharing request field of a second stage sidelink control information (SCI) message transmitted to the UE.

21. The UE of claim 20, wherein the COT sharing request includes a one-bit indication, wherein:

a first value of the one-bit indication indicates that the UE is not to initiate sharing of the COT with the second UE, and a second value of the one-bit indication indicates that the UE is to initiate sharing of the COT with the second UE, wherein the UE is configured to determine parameters for acquiring the COT.

22. The UE of claim 20, wherein a higher layer parameter received over the sidelink interface from the second UE indicates whether the COT sharing request field is included in the second stage SCI message or not.

23. The UE of claim 22, wherein:

a first value of the higher layer parameter indicates that the UE is not to initiate sharing of the COT with the second UE, and a second value of the higher layer parameter indicate that the COT sharing request includes an indication of a plurality of channel access priority classes (CAPCs) from which the UE is to select to use for acquiring the COT.

24. The UE of claim 16, wherein the COT sharing request includes a buffer status report (BSR) indicating a buffer of the data that the second UE is to transmit during the COT over the sidelink channel to one or more sidelink UEs.

25. The UE of claim 24, wherein the COT sharing request includes an indication of a maximum number of COTs that the UE is to acquire, wherein the UE is configured to acquire the COT when the BSR is greater than zero if a number of COTs acquired by the UE to share with the second UE is less than the maximum number of COTs, wherein the UE receives an update of the BSR from the second UE at the end of each COT when the UE is not included in the one or more sidelink UEs to which the second UE transmits the data during the COT.

26. The UE of claim 24, wherein the COT sharing request includes an indication of a channel occupancy of the second UE, wherein the channel occupancy indicates a percentage of receive samples measured by the UE where a receive signal strength indicator (RSSI) is above a preconfigured threshold.

27. The UE of claim 16, wherein determining to acquire the COT for COT sharing with the second UE includes:

determining, based, at least in part, on the COT sharing request, whether a probability of acquiring the COT by the UE is higher or lower than a probability of acquiring the COT by the second UE;

acquiring the COT and initiating COT sharing of the acquired COT with the UE in response to a determination that the probability of acquiring the COT by the UE is higher than the probability of acquiring the COT by the second UE; and foregoing acquiring the COT and initiating COT sharing in response to a determination that the probability of acquiring the COT by the UE is not higher than the probability of acquiring the COT by the second UE.

28. The UE of claim 16, wherein receiving the data during the COT over the sidelink channel to the one or more sidelink UEs includes:

receiving the COT sharing request from the second UE based on:

the second UE performing a category 2 (Cat2) listen-before-talk (LBT) when a gap between transmissions of the UE and transmissions of the second UE is greater than a predetermined threshold; and the second UE using a cyclic prefix (CP) extension to compensate for the gap being greater than the predetermined threshold.

29. A method of wireless communication performed by a user equipment (UE), the method comprising:

transmitting a channel occupancy time (COT) sharing request to a second UE, wherein:

the COT sharing request indicates to the second UE to initiate sharing with the UE of a COT acquired by the second UE to access a sidelink channel;

the COT sharing request is included in a COT sharing request field of a second stage sidelink control information (SCI) message; and the COT sharing request includes a buffer status report (BSR) indicating a buffer of data that the UE is to transmit during the COT;

receiving COT sharing information from the second UE, the COT sharing information configured to facilitate access to the COT by the UE; and transmitting the data over the sidelink channel to one or more sidelink UEs during the COT shared by the second UE.

30. A method of wireless communication performed by a user equipment (UE), the method comprising:

receiving, from a second UE, a channel occupancy time (COT) sharing request to initiate sharing with the second UE of a COT acquired by the UE to access a sidelink channel, wherein:

the COT sharing request is included in a COT sharing request field of a second stage sidelink control information (SCI) message;

the COT sharing request includes a buffer status report (BSR) indicating a buffer of data that the second UE is to transmit during the COT; and the BSR indicates to the UE whether to acquire the COT for sharing with the second UE;

determining whether to acquire the COT for COT sharing with the second UE; and transmitting, based on a determination to acquire the COT, COT sharing information to the second UE, the COT sharing information configured to facilitate access to the acquired COT by the second UE.

* * * * *